Feb. 2, 1971 — W. E. WALLES — 3,560,166
SYSTEM FOR TREATMENT OF SUBSTRATES BY A PLURALITY OF FLUID REACTANTS
Filed Feb. 5, 1968 — 3 Sheets-Sheet 1
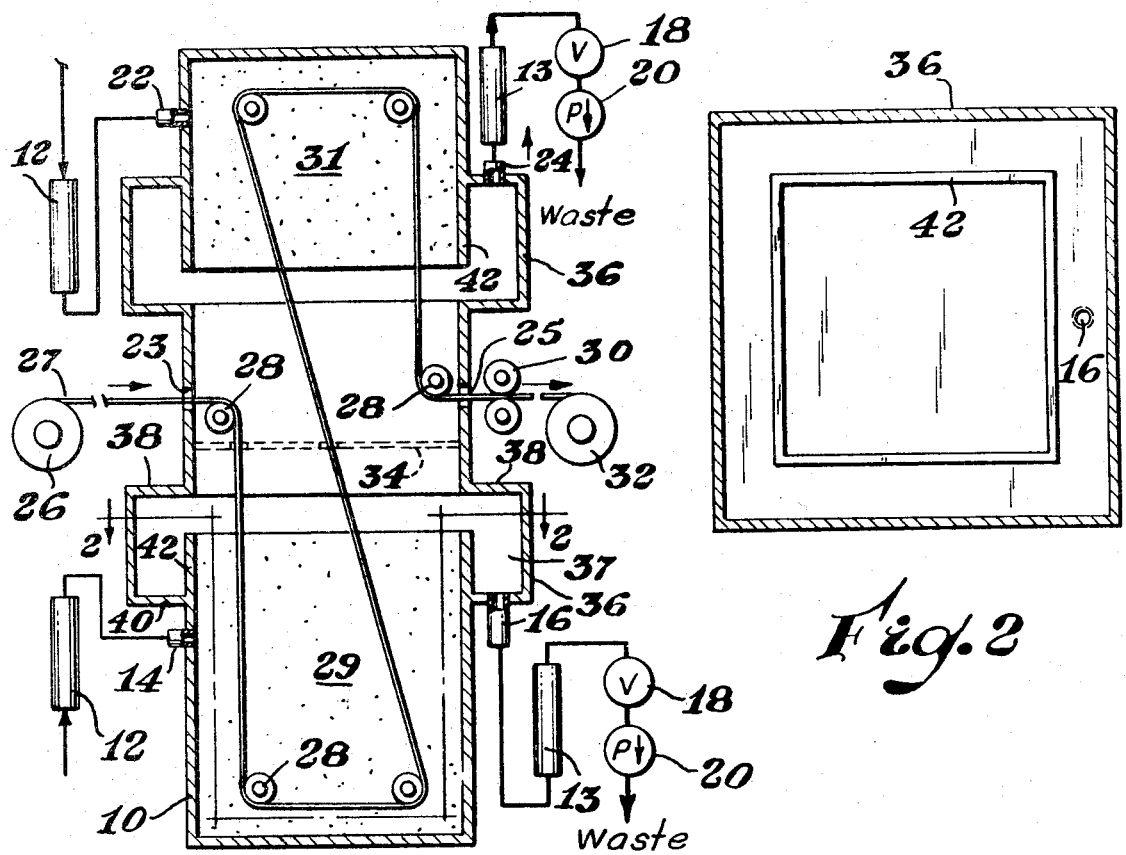
Fig. 2
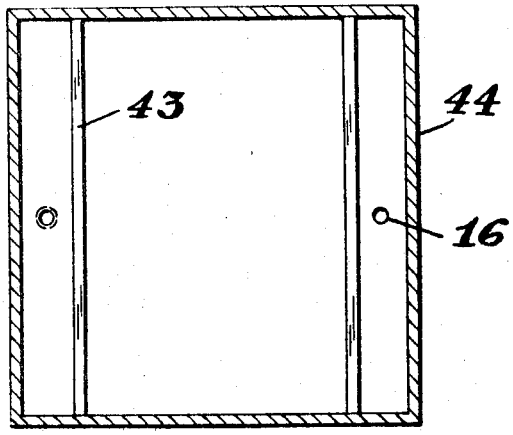
Fig. 1
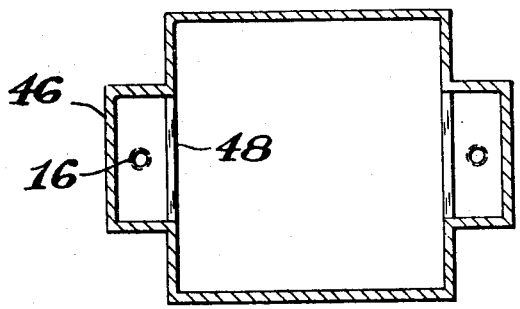
Fig. 3
Fig. 4
INVENTOR.
Wilhelm E. Walles
BY
AGENT

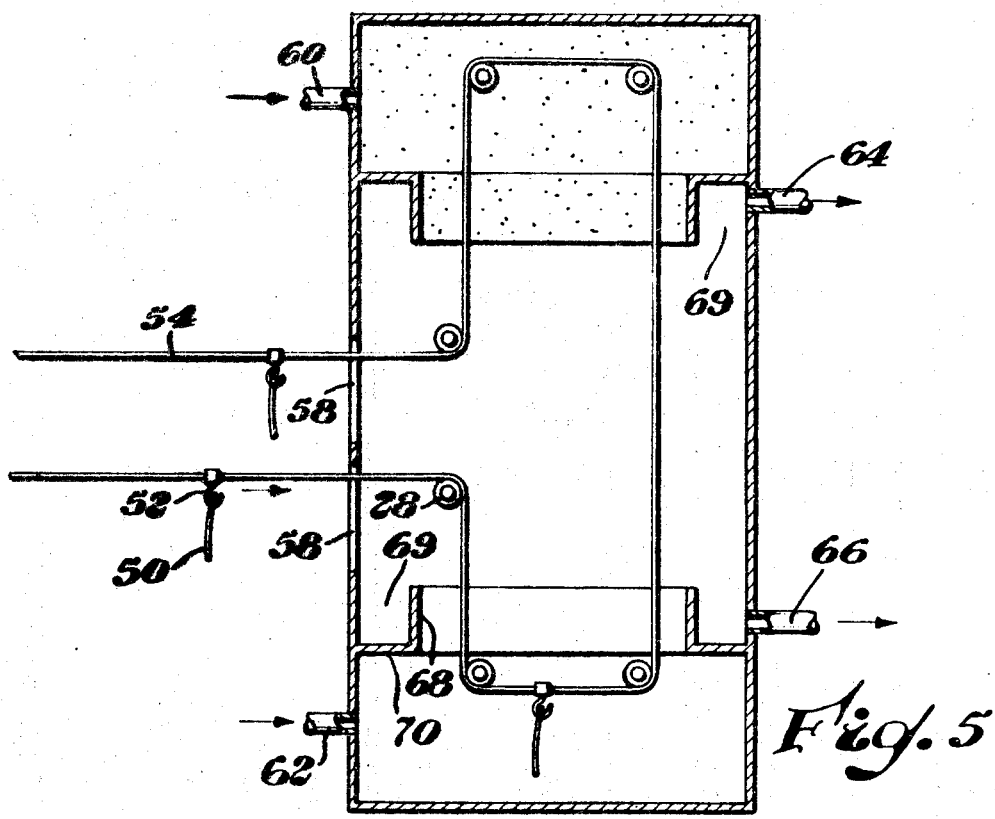
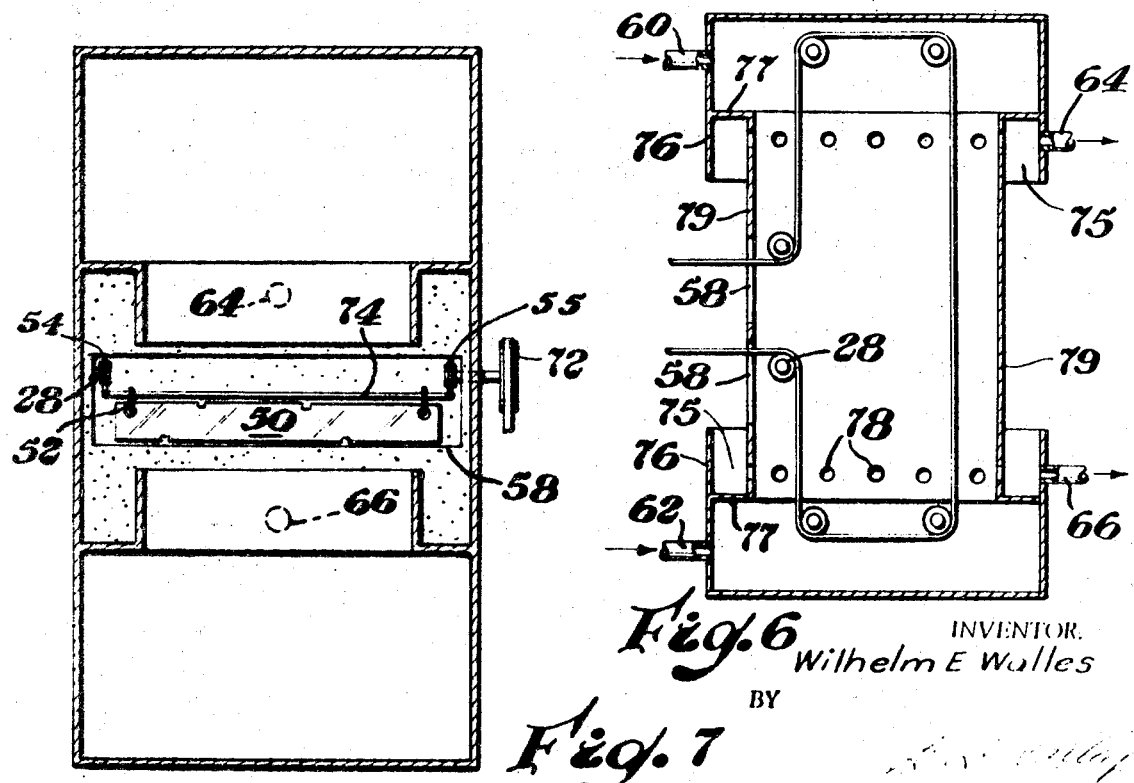

INVENTOR.
Wilhelm E. Walles

BY

AGENT

United States Patent Office 3,560,166
Patented Feb. 2, 1971

3,560,166
SYSTEM FOR TREATMENT OF SUBSTRATES BY A PLURALITY OF FLUID REACTANTS
Wilhelm E. Walles, Midland, Mich., assignor to The Dow Chemical Company, Midland, Mich., a corporation of Delaware
Filed Feb. 5, 1968, Ser. No. 703,085
Int. Cl. B01j 1/00
U.S. Cl. 23—285       16 Claims

ABSTRACT OF THE DISCLOSURE

A system and apparatus for effecting the continuous chemical treatment of substrates by layers of two chemical reactants having different densities, one lighter than air and one heavier than air is described. The substrates are led into a vertical container having two sections, one section having one reactant, then into a layer of air separating the reactants and then into the second section having the other reactant. The layers of reactants are established by vertical walls of a predetermined height and excess reactants are removed by means of interior or exterior channels in the system.

This invention relates to a system and apparatus for effecting the continuous treatment of substrates by two chemical reactants having different densities, one of which is lighter than air and is separated from the other denser layer by a layer of air.

More specifically, the invention relates to a system and apparatus in which two chemical reactants having different densities are maintained separately in layers so that substrates or articles to be treated such as plastic films or plastic articles can be continuously treated by contacting the heavier reactant first and the lighter reactant second or vice versa with a continuous supply and removal of the chemical reactants in a manner such that the layers of chemical reactants are not disturbed or mixed.

The object of this invention is thus to provide a system and apparatus which will permit the continuous chemical treatment of various substrates with chemical reactants of different densities, one of which is lighter than air, in a manner such that the layers of reactants are continuously used and continuously replenished without disturbing the layers or zones of chemical reactants.

A further object of this invention is to provide a system in which substrates are treated with noxious and corrosive chemical reactants in a manner such that little or none of the chemical reactants escape into the surrounding atmosphere.

The objects of this invention are attained in a system and apparatus provided with two container sections, each provided with means to supply thereto continuously one of the reactant fluids and to remove therefrom continuously a surplusage of such fluid while maintaining a stable interface between the fluid in such container section and a common body of air between the fluids, and with conveyor means to transport an elongated article or a series of articles to be treated into and through the fluid in one of such container sections, thence through the intermediate body of air, and into and through the other fluid in the other of such container sections.

This invention is illustrated by the accompanying drawings in which

FIG. 1 is a diagrammatic vertical cross-sectional view of one species of the invention showing a vertical arrangement of the sections.

FIG. 2 is a cross-sectional view of FIG. 1 taken on section line 2—2.

FIG. 3 is a similar cross-sectional view of a modification of FIG. 1.

FIG. 4 is a similar cross-sectional view of a further modification of FIG. 1.

FIG. 5 is a vertical cross-sectional view of another modification of the invention showing a conveyor belt entering and leaving the system on the same side.

FIG. 6 is a vertical cross-sectional view of a further modification of the invention.

FIG. 7 is a vertical cross-sectional view showing the details of the conveyor belt as it leaves the system similar to FIG. 5 except that FIG. 7 is illustrative of the system in which the conveyor belt enters and leaves on opposite sides of the system analogous to FIG. 1.

Figure 8:
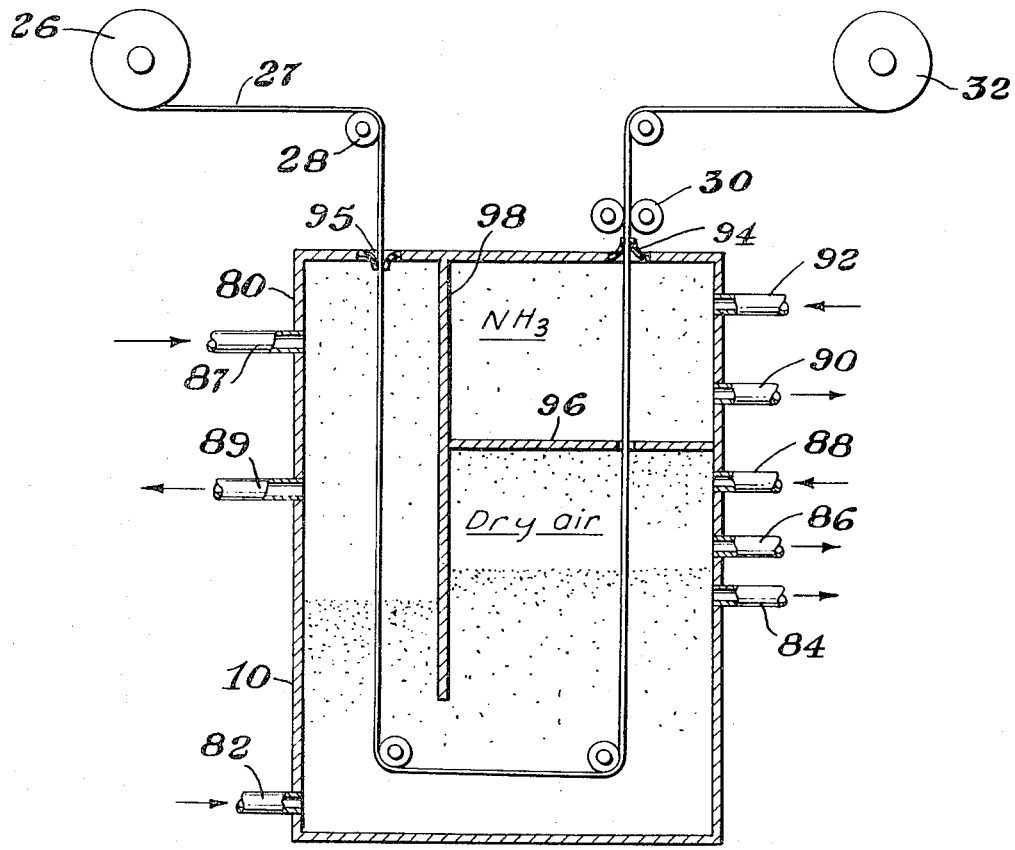
FIG. 8 is a vertical cross-sectional view of a further variation of the invention.

In FIG. 1 the container 10 is shown which has chemical reactants fed to it through flow meters 12 and inlets 14 and 22. The container 10 can be of any cross-sectional shape such as circular, oval, rectangular, or square shaped as is shown herein. The excess chemical reactants are removed through outlets 16 and 24 and pass through another set of flow-meters 13 (examples of these flow-meters are rotometers) before they pass through the valves 18, pump 20 and eventually to be discarded as waste. In the event the two chemical reactants are basic and acidic respectively, they can be combined to neutralize each other and the values recovered. For example, when using sulfur trioxide gas and ammonia as the chemical reactants, sulfamic acid or ammonium sulfamate can be recovered after mixing the excess chemical reactants.

The purpose of the flow-meters 12 and 13 is to provide the operator with a guide at all times to the amount of fresh chemical reactants which are flowing into the system so that the proper layer or volume of chemical reactants can be maintained in the system to insure that the substrates are completely treated. It is to be understood that the same auxiliary equipment is provided for all the modifications shown in the drawings even though such accouterments have not been illustrated.

The substrates are continuously provided by supply means such as a feed roll 26 which supplies a film, carpet, cloth, or yarn 27 to the container 10 having an opening 23 to receive the substrates and an outlet 25 to remove the substrates. The substrates are then directed downwardly by rolls 28 into the denser chemical reactants, upwardly into the layer of air above the lower reactant, into the reactant lighter than air, and out of outlet 25. Squeeze rolls 30 provide the necessary power to pull the substrate through the system and the treated substrate is collected on take-up reel 32. It will be understood that the reverse order of contact can be achieved, if desired, by reversing the direction of travel of the substrates.

It is to be understood that various routes may be taken by the substrates through the container as is illustrated in FIG. 5 wherein the substrates go into and come out the same side or the opposite side as illustrated by FIG. 1. It is also to be noted that individual items may be fed into the container on a conveyor belt as is illustrated in FIGS. 5 and 7 and that similarly the conveyor belt can be routed so that it goes in and comes out the same side (FIG. 5) or on opposite sides (FIG. 7).

Although it is not absolutely necessary, the container 10 can be provided with one or more horizontal baffles 34 (having suitable openings for the substrates which are not illustrated) in order to assist in keeping the layers of chemical reactants from intermixing especially when it is desired to have a high through-put of the substrates with the concurrent generation of eddy currents in the fluid chemical reactants.

The denser chemical reactant is thus supplied to space 29 in a manner such that it is continuously replenished. This chemical reactant can be for example, a liquid chemical reactant such as a minor amount of sulfur trioxide dissolved in an inert liquid diluent such as methylene chloride, a heavy gaseous mixture such as carbon dioxide with a minor amount of sulfur trioxide mixed therein, or a heavy gas such as chlorine.

It is desirable to have the rate of flow through the exhaust flow-meters 13 greater than or equal to the rate of flow through the inlet flow-meters 12 in order to keep a fresh supply of chemical reactants in the space 29 at all times. Thus, when the flow is greater through flow-meters 13 some air will be entrained with the chemical reactant. It is desirable to have the rates of flow about equal. Since exact adjustments are difficult to obtain and maintain, it is better to have the unbalanced flow rate set forth above so that the excess of chemical reactant in space 29 never exceeds the capacity of the exhaust system.

In order to maintain the level of chemical reactant in space 29 at a predetermined level, channel 37 is provided by the space enclosed within the exterior wall 36, top wall 38, bottom wall 40, and inner wall 42. Thus, the excess of chemical reactant in space 29 will spill over the inner wall 42 into channel 37 which in this case is an exterior channel, and be carried away by outlet 16.

In a similar manner to the foregoing, the upper portion or section of container 10 is constructed to contain a chemical reactant lighter than air in space 31. An example of this lighter reactant is ammonia. Other reactants which can be used are, for example, hydrogen gas and hydrogen fluoride. The space between the upper and lower sections of container 10 is filled with air. The channel 37 in the lower section, and the corresponding channel in the upper section of the container, serve to maintain stable interfaces between the bodies of fluid reactants in spaces 29 and 31, respectively, and the intervening body of air; thus no intermixing or reacting of the two chemical reactants takes place.

FIG. 3 shows a modification of FIG. 1 in which the exterior channel 37 does not go completely around the container 10 but is divided into two separate exterior channels by the inner wall 43, and the outer wall 44 with separate outlets 16 for each channel. The outflow from the separate outlets may be combined before passing into the flow-meters in a manner not shown. A similar construction may be employed in connection with the upper section of the apparatus of FIG. 1.

FIG. 4 shows a further modification similar to FIG. 3 in which the inner walls 48 are shortened, as are the outer walls 46. This modification is useful where the substrate is relatively unreactive towards the chemical reactants and not much replacement of the reactants is necessary.

If desirable, the modifications shown in FIGS. 2–4 can be incorporated into the upper and lower portions of reactor 10 so that the same type of exterior channels are used or a mixture of one type with another can be used.

FIG. 5 shows another embodiment in which interior channels 69 are provided instead of exterior ones as in FIG. 1. In this embodiment the container 10 is provided with inlets 60 and 62 and outlets 64 and 66 for the chemical reactants and with flow-meters, etc., in a manner similar to FIG. 1. The substrate is illustrated in this case by a plurality of single articles 50 which is carried into and out of the reactor by the hooks 52 on a conveyor line consisting of cable 54, cable 55 and rod 74 (both shown in FIG. 7). Alternatively, one might use clamps to hold the articles on the conveyor in place of the hooks 52. The conveyor line is illustrated as entering and leaving from the same side of the container. However, it is apparent that one could also cause the conveyor line to exit on the opposite side, analogous to the system of FIG. 1. This is illustrated in FIG. 7.

An interior wall 68 is provided in FIG. 5 which extends vertically a substantial distance from the bottom wall 70 so that a predetermined amount of the chemical reactant is maintained before it spills over into channel 69. In any event, the height of the interior wall 68 is less than the opening 58 which is provided for the conveyor line 54 and 55 and its contents.

FIG. 7 shows the details of the conveyor line, i.e. cables 54, 55 and rod 74 as it passes through the outlet opening 58 and over the pulley 28. The conveyor line is provided with power from a driving wheel 72. For purposes of clearly illustrating the relationship of the cables 54 and 55 to the pulleys 28 and rod 74, the cables are shown having some length.

FIG. 6 shows a still further modification of the invention similar to FIG. 5 but having exterior channels 75. In this embodiment the container 10 is provided with inlet openings 60 and 62 and outlet openings 64 and 66 exactly as mentioned previously and conveyor openings 58. The exterior channels 75 are provided by an exterior wall 76 which is coextensive with the container wall and extends vertically (upwardly in the lower section and downwardly in the upper section) a substantial distance to provide an outside retaining wall for the chemical reactant. A bottom wall 77 joins this exterior wall 76 with an interior wall 79 spaced inwardly from and generally parallel to said container wall. The interior wall 79 is provided with a plurality of apertures 78 located a predetermined distance from the bottom wall 77 so as to maintain a substantial layer of the chemical reactant in the upper and lower parts of the container and yet provide for an even flow of the excess chemical reactant into the exterior channel 75.

The channels shown in FIGS. 5–7 all have overflow means of channels which are circumferential in extent. It is to be understood that the modifications can be further altered to provide channels of less capacity and extent similar to the inventions shown in FIGS. 3 and 4. Likewise, FIGS. 5–7 should not be construed as being restricted to a square container but may be made of a circular or rectangular configuration if desired.

FIG. 8 shows a still further modification of the invention in which a film is the substrate and the container 80 is provided with a vertical baffle 98 which is sealed against the top and sides of the container but not against the bottom so that substantially two sections are formed. In a manner similar to the optional baffle 34 in FIG. 1, an optional horizontal baffle 96 can be provided which is sealed to the sides of the container and to the vertical baffle 98. Inlets 82 and 92 and outlets 84 and 90 are provided in a manner similar to FIG. 1. In this case, however, a special layer of dried air is provided over the denser reactant by the inlets 87 and 88 and outlets 86 and 89. This dry air is desirable in an application of this system to the sulfonation of plastic films with a dilute mixture of sulfur trioxide in an inert gas in a place where the ambient air is moist. This moisture must be excluded since it converts the sulfur trioxide to a mist of sulfuric acid and either interferes with or completely inhibits the sulfonation of the substrate.

The dry air is substantially retained in the first compartment by the flexible wipers 95, and the less dense chemical reactant (ammonia) is substantially retained in the second compartment by the flexible wipers 94. A small amount of loss in each compartment is unavoidable but the loss is constantly replenished by the inlets 92 and 87.

As is hereinbefore disclosed, the film 27 is supplied by a supply reel 26, guided by rollers 28 with power being supplied by squeeze rollers 30 and the treated film 27 is collected on take-up reel 32.

Figure 9:
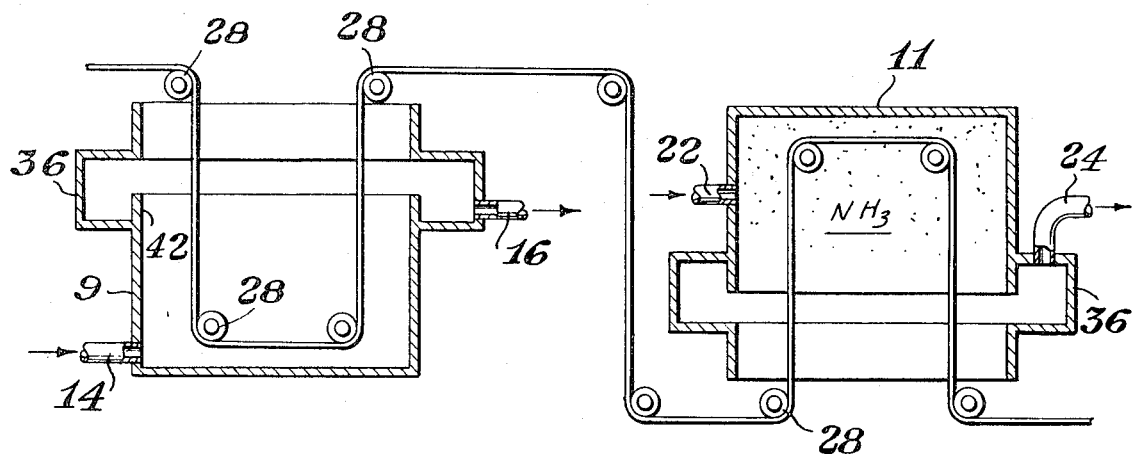
FIG. 9 is a vertical cross-sectional view of the invention similar to that shown in FIG. 1 in which the container sections are displaced horizontally.

FIG. 9 shows a reactor which is similar in all respects to the reactor or container 10 of FIG. 1 except that two sections 9 and 11 have been obtained by dividing the reactor 10 at its midpoint. The advantage of this system lies in the fact that vertical height is conserved and thus this system is useful in production areas where there is adequate horizontal room but inadequate vertical space.

The materials from which this system is constructed are not critical and will be readily apparent to one skilled in the art. Thus, stainless steel is indicated where the chemical reactants are highly corrosive as for example when fuming sulfuric acid is used as the denser chemical reactant.

It is apparent that the system of this invention is useful to continuously chemically treat a variety of substrates such as films, carpets, cloth, yarns, filaments, and discrete articles which must be given a dual chemical treatment such as sulfonation and neutralization, chlorination and neutralization, etc.

The invention has been illustrated with a layer of air separating the chemical reactants but it will be understood that other inert gases or gaseous mixtures having the same or a similar density may be used such as nitrogen.

I claim:

1. Apparatus for effecting the continuous treatment of substrates by two chemical reactants having different densities, one lighter than an inert gas and one heavier than said inert gas, and separated from the other by a layer of said inert gas comprising;
   (a) container means comprising two vertically disposed, interconnected, substantially closed, sections each having vertical side walls with a closed end wall whereby the upper section for lighter reactants is joined to the lower section for heavier reactants to form said container means with an intermediate section containing an inert gas between said sections, said container means having openings for supplying and removing substrates located in said intermediate section,
   (b) separate means to supply said rectants to each of said upper and lower sections connected to said container means remote from said end walls thereof whereby a substantial layer of said lighter and heavier reactant is formed in each of said sections.
   (c) separate overflow means to remove excess reactants from each of said sections located more remote from said end walls than said means to supply a reactant,
   (d) means to supply and remove said substrates through said supply and removal openings, through one of said reactants, through said inert gas layer and through the other of said reactants.

2. Apparatus as set forth in claim 1 in which the overflow means comprises exterior channels into which the excess chemical reactants drain and are removed.

3. Apparatus as set forth in claim 1 in which the overflow means comprises interior channels into which the excess chemical reactants drain and are removed.

4. Apparatus as set forth in claim 2 in which the exterior channels comprise an exterior wall spaced outwardly from and substantially parallel to at least one of the vertical walls of the section, a top and bottom wall joining with said exterior wall and an inner wall coextensive with said vertical wall of said section and ending at a distance intermediate of the distance between said top and bottom walls.

5. Apparatus as set forth in claim 3 in which the interior channels comprise an interior wall spaced inwardly from and substantially parallel to at least one of the vertical walls of the section, a bottom wall joining said interior wall with said section wall, said interior wall ending at a substantial distance from said bottom wall.

6. Apparatus as set forth in claim 2 in which the exterior channels comprise an exterior wall coextensive with said vertical side walls for a substantial vertical distance, an inner wall spaced inwardly from and substantially parallel to said vertical side walls and joining said sections, and a bottom wall joining said exterior wall with said vertical side walls, said inner wall having a plurality of apertures located at a vertical distance substantially less than the vetrical extent of the exterior wall.

7. In a system for effecting the continuous treatment of substrates by two chemical reactants having different densities, one lighter than an inert gas, one heavier than said inert gas and separated from the other by a layer of said inert gas, the combination comprising;
   (a) container means comprising two vertically disposed, interconnected, substantially closed section means each having vertical side walls with a closed end wall whereby the upper section means for lighter reactants is joined to the lower section means for heavier reactants to form said container means with intermediate section means containing an inert gas between said section means, said container means having openings for supplying and removing substrates located in said intermediate section means,
   (b) separate means to supply said reactants to each of said upper and lower section means connected to said container means remote from said end walls thereof whereby a substantial layer of said lighter and heavier reactant is formed in each of said section means,
   (c) separate overflow means to remove excess reactants from each of said upper and lower section means located more remote from said end walls than said means to supply reactants,
   (d) means to supply and remove said substrates through said supply and removal openings, through one of said reactants, through said inert gas layer and through the other of said reactants.

8. A system as set forth in claim 7 in which the overflow means comprises exterior channel means into which excess chemical reactants drain and are removed.

9. A system as set forth in claim 7 in which the overflow means comprises interior channel means into which excess chemical reactants drain and are removed.

10. A system as set forth in claim 8 in which the exterior channel means comprise an exterior wall spaced outwardly from and substantially parallel to at least one of the vertical walls of the section, a top and bottom wall joining with said exterior wall, and an inner wall coextensive with said vertical wall of said container means and ending at a distance intermediate of the distance between said top and bottom walls.

11. A system as set forth in claim 9 in which the interior channel means comprise an interior wall spaced inwardly from and substantially parallel to at least one of the vertical walls of the section means, a bottom wall joining said interior wall with said section wall, said interior wall ending at a substantial distance from said bottom wall.

12. A system as set forth in claim 8 in which the exterior channel means comprise an exterior wall coextensive with said vertical side walls for a substantial vertical distance, an inner wall spaced inwardly from and substantially parallel to said vertical side wall and joining said section means, and a bottom wall joining said exterior wall with said vertical side walls, said inner wall having a plurality of apertures located at a vertical distance substantially less than the vertical extent of the exterior wall.

13. Apparatus for effecting the continuous treatment of substrates by two gaseous chemical reactants having different densities, one lighter than a dry inert gas and one heavier than said inert gas, with a first layer of dry inert gas over said heavier reactant and a second layer of dry inert gas between said reactants comprising;
   (a) container means having a top, bottom, and side walls separated into two interconnected substantially closed sections by a vertical baffle connected to said top and side walls of said container means and having an end thereof spaced a predetermined distance from said bottom wall to form a first section for the heavier reactant and a second section for the lighter reactant, said container means having openings for supplying and removing substrates in said top wall, (b) means to supply a heavier reactant to said first section connected to said container means at a remote distance from said top wall, (c) means to supply a lighter reactant to said second section connected to said container means at a remote distance from said bottom wall, (d) means to continuously supply and remove a dry inert gas to said first section spaced from said top wall a lesser distance than said heavier reactant supply means, (e) means to continuously supply and remove a dry inert gas to said second section located on the same side of said baffle as the lighter reactant supply means and spaced a lesser distance from said bottom wall, (f) separate overflow means to remove excess reactants from each of said sections located between said reactant supply means and said dry inert gas supply and removal means, whereby a substantial layer of said lighter and heavier reactant is formed in each section, (g) means to supply and remove said substrates through said supply and removal openings and through said reactants.

14. Apparatus for effecting the continuous treatment of substrates by two chemical reactants having different densities, one lighter than an inert gas and one heavier than said inert gas comprising;

(a) a first separate section for said heavier reactants having an open top, vertical side wall and a bottom end walls, (b) a second separate section for said lighter reactant having a top end wall, vertical side walls and an open bottom, (c) separate means to supply said reactants to each of said sections connected thereto remote from said end wall whereby a substantial layer of said lighter and heavier reactant is formed in each of said sections, (d) separate overflow means to remove excess reactants from each of said sections located more remote from said end wall than said means to supply reactants, (e) means to supply and remove said substrates through each of said sections and through each of the reactants.

15. In a system for effecting the continuous treatment of substrates by two chemical reactants having different densities, one lighter than a dry inert gas, one heavier than said dry inert gas with a first layer of dry inert gas over said heavier reactant and a second layer of dry inert gas between said reactants, the combination comprising;

(a) container means having a top, bottom, and side walls separated into two interconnected substantially closed section means by a vertical baffle means connected to said top and side walls of said container means and having an end thereof spaced a predetermined distance from said bottom wall to form a first section means for the heavier reactant and a second section means for the lighter reactant, said container means having openings for supplying and removing substrates in said top wall, (b) means to supply a heavier reactant to said first section means connected to said container means at a remote distance from said top wall, (c) means to supply a lighter reactant to said second section means connected to said container means at a remote distance from said bottom wall, (d) means to continuously supply and remove a dry inert gas to said first section means spaced from said top wall a lesser distance than said heavier reactant supply means, (e) means to continuously supply and remove a dry inert gas to said second section means located on the same side of said baffle means as the lighter reactant supply means and spaced a lesser distance from said bottom wall, (f) separate overflow means to remove excess reactants from each of said section means located between said reactant supply means and said dry inert gas supply and removal means whereby a substantial layer of said lighter and heavier reactants is formed in each section means, (g) means to supply and remove said substrates through said supply and removal openings and through said reactants.

16. In a system for effecting the continuous treatment of substrates by two chemical reactants having different densities, one lighter than an inert gas, one heavier than said inert gas and separated from the other by a layer of said inert gas, the combination comprising;

(a) a first separate section means for said heavier reactant having an open top, vertical side walls and a bottom end wall, (b) a second separate section means for said lighter reactant having a top end wall, vertical side walls and an open bottom, (c) separate means to supply said reactants to each of said section means connected thereto remote from said end walls whereby a substantial layer of said lighter and heavier reactants is formed in each section means, (d) separate overflow means to remove excess reactants from each of said section means located more remote from said end walls than said means to supply reactant, (e) means to supply and remove said substrates through each of said section means and through each of the reactants.

References Cited
UNITED STATES PATENTS

| | | | |
|---|---|---|---|
| 1,589,329 | 6/1926 | Sheppard et al. | 204—183 |
| 2,577,915 | 12/1951 | Piller et al. | 34—36X |

JAMES H. TAYMAN, Jr., Primary Examiner

U.S. Cl. X.R.

8—149.1, 149.2; 23—252, 260, 1; 34—36; 68—5; 118—58, 66, 67; 134—2, 26, 27, 28, 30; 260—686, 694; 264—195, 340